July 23, 1974     J. M. HOAGLAND ET AL     3,825,644
PROCESS FOR PRODUCING MULTILAMINATE FILM
Original Filed Oct. 1, 1965     3 Sheets-Sheet 1
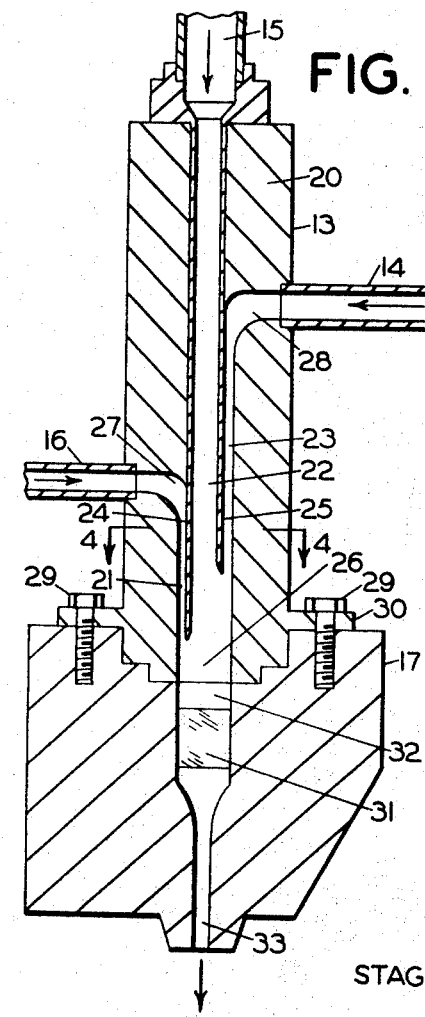
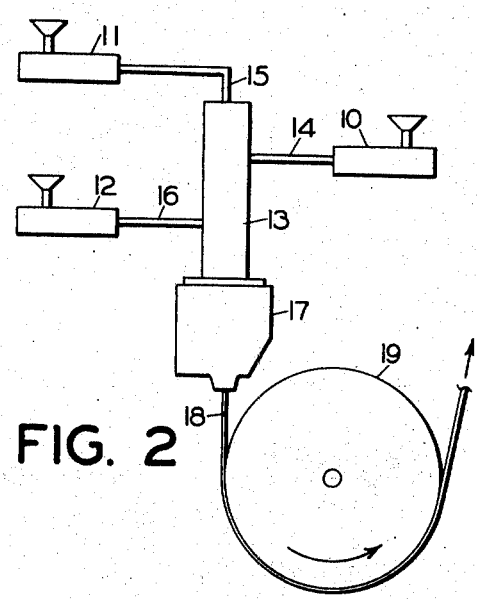
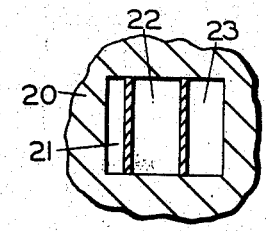
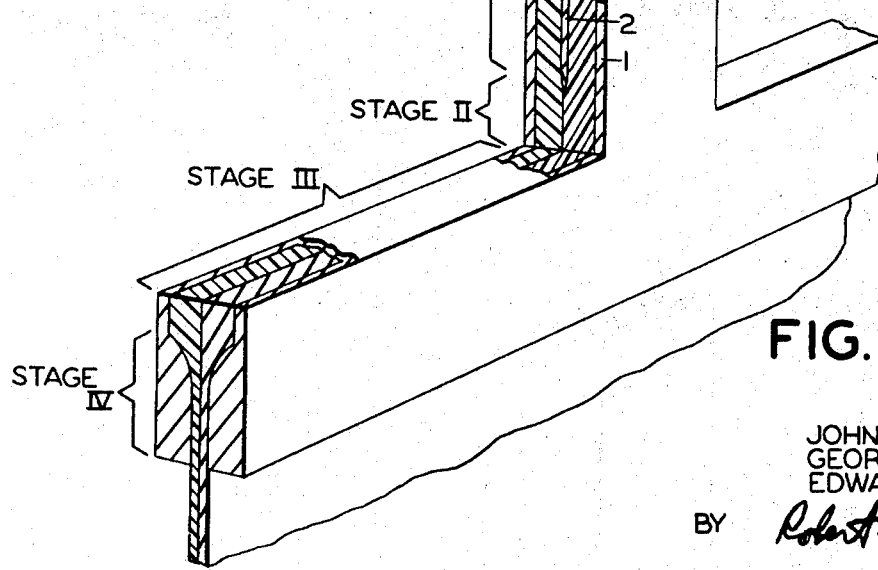
INVENTORS.
JOHN M. HOAGLAND
GEORGE M. TOKOS
EDWARD G. TONN
BY *Robert L. Howard*
ATTORNEY

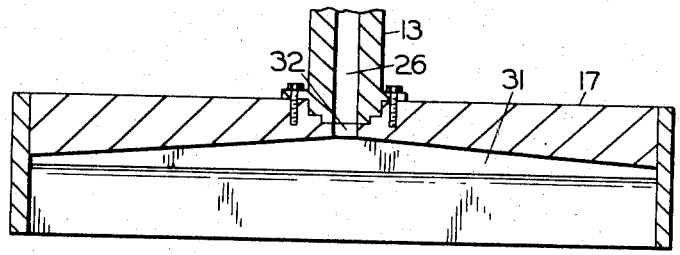
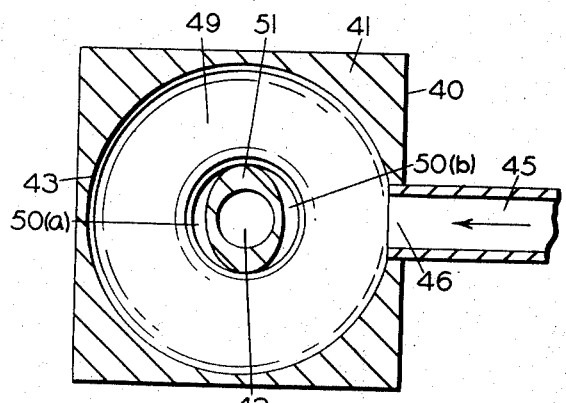
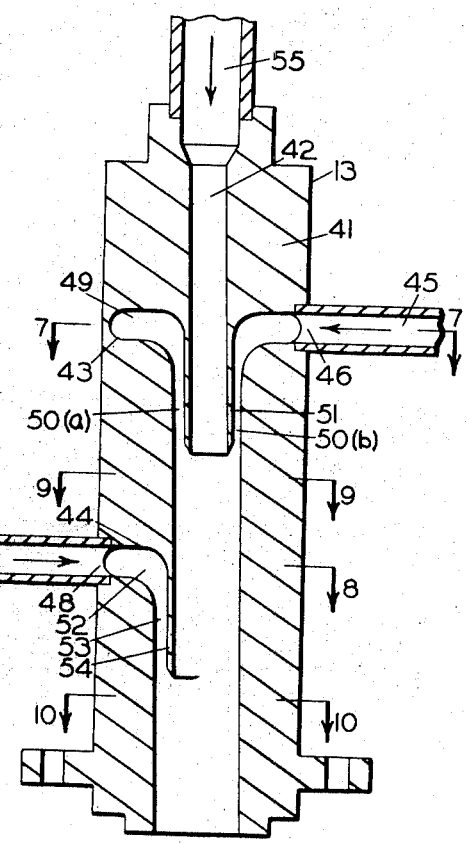
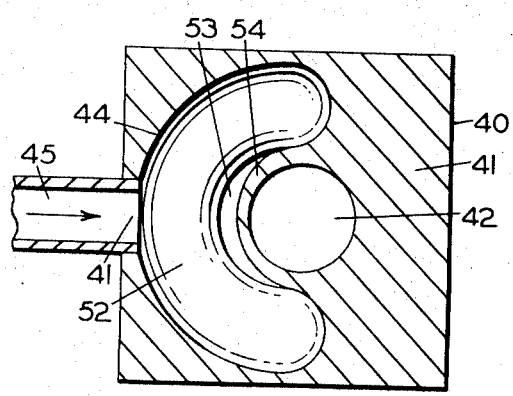

United States Patent Office

3,825,644
Patented July 23, 1974

3,825,644
PROCESS FOR PRODUCING MULTILAMINATE FILM
John M. Hoagland, Pleasant Hill, George M. Tokos, Dublin, and Edward G. Tonn, Oakland, Calif., assignors to Crown Zellerbach Corporation, San Francisco, Calif.
Continuation of application Ser. No. 862,126, Aug. 11, 1969, which is a division of application Ser. No. 492,212, Oct. 1, 1965, both now abandoned. This application Jan. 27, 1972, Ser. No. 221,405
Int. Cl. B29f 3/10; B32b 31/00
U.S. Cl. 264—171                                  4 Claims

---

ABSTRACT OF THE DISCLOSURE

A process for producing multilaminate film by forming a composite resin plug, laterally expanding the composite resin plug widthwise so as to produce a laterally expanded molten plastic resin stream substantially equal in width to that of a multilaminate thermoplastic film which is to be extruded through a long, narrow orifice of a die, and laminarly flowing the expanded molten plastic resin laminate to the long, narrow orifice and meanwhile compressionally convergently reducing the laterally expanded plastic resin stream in thickness to the long, narrow orifice, and extruding the thermoplastic film through the long, narrow orifice.

---

This invention relates to a process for producing multilaminate thermoplastic films, and the present application is a continuation of copending application Ser. No. 862,126, filed Aug. 11, 1969, now abandoned the latter being a division of application Ser. No. 492,212, filed Oct. 1, 1965 and now abandoned.

Background of the Invention

Films of thermoplastic resins formed of layers of diverse or similar resins are desirable because such multilaminate films provide the opportunity for a wider variety of characteristics than are possible by the employment of films formed from a single thermoplastic resin. Such multilaminate films are presently manufactured by several processes. For example, a thermoplastic resin may be applied to a thermoplastic resin film as a coating; thermoplastic films may be joined together after extrusion from a die head; or thermoplastic films may be joined together by forming them on a multi-roll calender. There are limitations and problems connected with each of these prior art processes. Adhesion between the various laminates is often not good, and there is frequently a problem of film uniformity. Also, it is difficult to make relatively thin multilaminate films on the order of 1 mil in thickness in a single casting operation by procedures employed in the prior art without employing auxiliary coating operations.

It is one object of this invention to provide a process for producing multilaminate thermoplastic films having excellent adhesion between layers and film uniformity.

It is another object of this invention to provide a process that may be employed to produce multilaminate films that are relatively thin.

These and other objects will become apparent from the following description, and by reference to the drawings, in which:

FIG. 1 is a schematic representation of the various stages that occur in the herein described process;

FIG. 2 is a schematic representation of an apparatus for forming a multilaminate thermoplastic film employing the laminator of this invention;

FIG. 3 is a sectional view of the laminator connected to the film expressing die head;

FIG. 4 is a cross section of the laminator taken along line 4—4;

FIG. 5 is a sectional side view of the die head;

FIG. 6 is a sectional side view of a second laminator embodiment of this invention;

FIG. 7 is a cross sectional view of the laminator of FIG. 6 taken along line 7—7;

FIG. 8 is a cross sectional view of the laminator of FIG. 6 taken along line 8—8;

Summary of Invention

Figure 9:
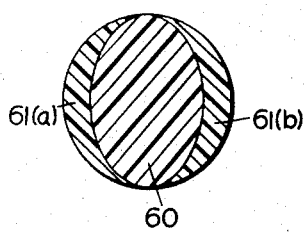
FIG. 9 is a cross section of a composite resin plug formed in one section of the laminator of FIG. 6.
Figure 10:
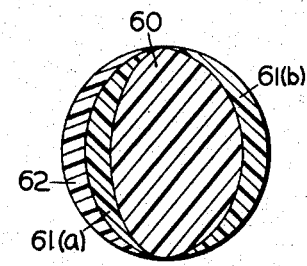
FIG. 10 is a cross section of a composite resin plug formed in a second section of the laminator of FIG. 6.

It has been found that a multilaminate film can be produced by bringing together a plurality of streams of molten thermoplastic resin before they are extruded through a film-producing die orifice. Heretofore, it has not been though possible to produce a multilaminate film in such a manner because it was to be expected that degradation of some of the less stable resins would occur due to the necessity of maintaining the die at the high temperatures necessary to obtain the flows and film characteristics of the more stable resins desired.

The present invention is effected by feeding a plurality of molten thermoplastic resin streams along independent, parallel passageways for a distance sufficient to establish laminar flow of each of the streams; bringing adjacent faces of parallel, moving streams together in a common passageway whereby a composite resin plug is formed having interfaces between the resin streams at their points of contact; expanding the resin plug laterally along an axis substantially perpendicular to the direction of flow of the composite resin plug, but substantially parallel to the planes of the lamina interfaces; and extruding the expanded resin plug through a long narrow orifice that is parallel to and directly below said axis.

From the time the resins are rendered molten until they are extruded from the long, narrow orifice as a multilaminate film, they must be maintained at a temperature above that at which they melt, but below that at which they are thermally degraded for the times to which they are exposed to these temperatures. That is, it has been found that while the parallel passageways along which the resin streams are moving, as well as the common passageways along which they travel after having been brought together, may be above that at which thermal degradation of the lowest melting of the resins is normally thought to occur, the velocity of the resin streams and the distances they have to travel are such that there is insufficient time of exposure of the least stable resin to these high temperatures to effect thermal degradation thereof.

Description of Preferred Embodiments

Referring now to FIG. 1, there is presented a schematic perspectivie view of the various stages two thermoplastic resins traverse in becoming laminated by the invention described herein. As is shown, two molten thermoplastic resins A and B are fed into independent, parallel passageways formed by partitions 1, 2 and 3. During the traverse of resins A and B through Stage I, lamina or non-turbulent flow is established.

The resins then come together in the common passageway formed between partitions 1 and 3, below the termination of partition 2, to form a composition resin plug. As the resins exit from their independent passageways into the common passageway, they are moving at substantially the same velocity in order to prevent undue shearing at the interface thereof, which would produce turbulence and intermixing. Laminar flow is maintained during traverse of the composite resin plug through Stage II. During Stage II, some of the bonding occurs between the resins at the interface thereof. The exact nature of this and subsequent bonding that occurs is not known, but it is believed that some small amount of uniform physical intermixture between the resin laminae occurs at their interface due to the molten condition of each.

During Stage III, the composite resin plug is expanded laterally along an axis perpendicular to the direction of flow to form an expanded laminate stream substantially the final width of the film desired. During lateral expansion of the composite resin plug, lamina integrity is maintained due, at least in part, to the laminar or non-turbulent flow conditions imposed. The resin plug should not be expanded in a transverse direction to any substantial degree as this tends to promote non-uniformity of distribution.

During Stage IV, the expanded laminate stream is uniformly compressed along its length into a thin film of laminated resins about 20 mils thick. This is physically accomplished by extruding the expanded laminate stream through an elongated die orifice. The laminated resin film is extruded under essentially laminar flow conditions to maintain the integrity of the various resin laminae. After extrusion from the die orifice the film is drawn down to a thickness of about 1 mil in a conventional manner, to be hereinafter explained.

Referring now to FIG. 2, reference numerals 10, 11 and 12 represent conventional extruders which feed molten thermoplastic resin to molten resin laminator 13 via conduits 14, 15 and 16. These molten resin streams are combined in the molten resin laminator in a manner to be hereinafter explained, and the combined stream is then fed to die head 17. From die head 17, a multilaminate thermoplastic film 18 is extruded onto chill roll 19 wherein it is rendered non-molten. From chill roll 19, multilaminate thermoplastic film 18 is led by rolls along a path, where it is further cooled and/or treated in any conventional manner, to a wind-up roll (not shown). While in the description of the invention herein reference is made to chilling the film on a chill roll, this is for purposes of illustration only, and is not intended to be limiting as any manner of handling the film after extrusion from a die head may be employed, such as immersion in a water bath or applying it to a web substrate as a laminate coating.

FIG. 3 illustrates details of construction of the preferred embodiment of the molten resin laminator of this invention as it is connected to a die head. In this preferred embodiment, molten resin laminator 13 is comprised of a body 20 having rectangularly-shaped independent passageways 21, 22 and 23 formed by partitions 24 and 25 running centrally and vertically therein. Independent passageways 21, 22 and 23 open into common passageway 26 at a point removed from the lower end of laminator 13, as illustrated. Communicating with independent passageways 21 and 23 are channels 27 and 28, respectively. Channel 27 is connected to extruder 12 (FIG. 2) by conduit 16, and channel 28 is connected to extruder 10 by conduit 14. Conduit 15 from extruder 11 communicates with independent passageway 22. Body 20 is tapped at suitable positions around its periphery for use of conventional resistance heating elements (not illustrated) to maintain the desired temperature of the resins as they move down through independent passageways 21, 22 and 23.

The lower end of molten resin laminator 13 is connected to film extruding die head 17, as illustrated. The die head 17 is fastened to adaptor 13 by any suitable means, such as studs 29 seated in tapped holes in die head 17, and passing through flange 30 at the lower end of molten resin laminator 13.

Common passageway 26 of molten resin laminator 13 opens directly into resin receiving manifold chamber 31 of die head 17. Manifold chamber 31 is generally rectangular in cross section, and runs the longitudinal length of the die head 17. A generally rectangularly shaped manifold chamber is desirable in order to maintain uniform thickness across the film width of the various resin layers of the multilaminate film to be extruded. Manifold chamber 31 communicates with common passageway 26 via opening 32. Manifold 31 is desirably machined so that its cross sectional area diminishes as the ends thereof are approached. That is, the cross sectional area of the central portions are greater than for the end portions. This is effected by uniformly decreasing the height of manifold chamber 31 as the end portions are approached, but not the width. This is illustrated in FIG. 5. This latter expedient appears to additionally promote uniformity of thickness of the various layers of the multilaminate film to be extruded, apparently due to decreasing the distance the resin forming the edge portions of the film has to travel before being extruded. Manifold 29 opens into die orifice 33.

In operation, resins having differing characteristics are melted in extruders 10, 11 and 12 and are fed to molten resin laminator 13 via conduits 14, 15 and 16, respectively. The molten resin entering molten resin laminator 13 via conduit 14, is fed into outer independent passageway 23 via channel 28. The molten resin coming from extruder 11 via conduit 15 enters central independent passageway 22. The molten resin from extruder 12 entering molten resin laminator 13 via conduit 16 enters the other outer independent passageway 21 via channel 27. The three resin streams descend through molten resin laminator 13 in their respective independent passageways until the passageways terminate by opening into a common passageway 26. In common passageway 26 the resins which are to form the various layers of the multilaminate film to be extruded are brought together along substantially parallel paths, and the composite resin plug flows down common passageway 26 into manifold chamber 31 of die head 17 via opening 32. There is no significant intermixture of the resin layers as they descend through common passageway 26 into manifold chamber 31 and out orifice 33. The multilaminate film 18 is expressed out through long, narrow orifice 33 where it travels a short distance exposed to the ambient atmosphere before coming into contact with chill roll 19. Film 18 may be further cooled and/or treated in any conventional manner, and then wound up into a roll.

The ratios of the thickness and/or weights of various layers making up the multilaminate film composition to be produced by the hereindescribed procedure are determined by the ratios of the feed rates of the resin components through the adaptor. Since the velocity of a particular resin stream is inversely proportional to the cross sectional area of the stream, it is seen that for a particular ratio of feed rates, the velocity ratio of the resin streams is determined by the cross sectional areas of the streams, and may be fixed at any predetermined value.

As stated previously, it has been found desirable to have the relative velocities of the resin streams as they come together in the common chamber of the adaptor along substantially parallel paths approximately the same to prevent undue shearing and turbulence at the interfaces thereof, which would result in non-uniformity of thickness of the various laminae across the web width.

The following example illustrates the operation of the embodiment illustrated in FIGS. 2 to 5.

EXAMPLE 1

A low density polyethylene is fed into extruder 11 wherein it is heated to a molten state at about 570° F. Extruder 11 is a conventional Aetna Standard extruder having a 6-inch barrel diameter. The molten polyethylene is fed into independent passageway 22 of molten resin laminator 13 via conduit 15 at a rate of about 250 lbs./hr. Polypropylene is fed into extruder 10 (4½ inch barrel diameter Black Clawson) wherein it is heated to about 540° F. and rendered molten. The molten polypropylene is fed into independent passageway 23 of molten resin laminator 13 by means of conduit 14 and channel 28 at a rate of about 250 lbs./hr. A copolymer of ethylene-vinyl acetate is fed into extruder 12 (1¾ inch barrel diameter Black Clawson) where it is heated to about 400° F. and rendered molten. The molten copolymer is then fed into independent passageway 21 of molten resin laminator 13 by means of conduit 16 and channel 27 at a rate of about 15 lbs./hr. These resin streams move down their respective independent passageways under laminar flow conditions, and come together along substantially parallel paths in common passageway 26 to form a composite resin plug. Molten resin laminator 13 is maintained at a temperature of about 570° F. by means of resistance heaters mounted on laminator body 20. From the common passageway 26, the composite resin plug moves through opening 32 of die head 17 into resin receiving manifold chamber 31 where it is expanded laterally along the length of the manifold into an expanded laminate stream. The expanded laminate stream is then expressed through orifice 33 onto chill roll 19, which is maintained at a temperature of about 80° F. The film is wound up on a roll at a speed of about 300 f.p.m. The resulting film has a thickness of about 1 mil due to the drawing down action of the chill roll pulling on the extruded film, and is comprised of three distinct layers. The polyethylene layer is in the middle and comprises about 48% by weight of the total film composition. The polypropylene layer forms one outer layer of the multilaminate film, and comprises about 49% by weight of the film composition, while the copolymer of ethylene-vinyl acetate forms the other outer layer and comprises about 3% by weight of the film composition. There is substantially no intermixing of the resins, the film being comprised of three substantially distinct, uniform layers.

In the foregong description and example, the molten resin laminator embodiment of FIG. 3 has been described as having three molten thermoplastic resin sources and three resin-carrying passageawys. This description is to be considered illustrative only, and not limiting as it is apparent that any number of passageways, two or greater, may be employed to produce a multilaminate film having a corresponding number of layers. Also, the resins fed into the various passageways need not be different resins, but could be the same resin being split fed from a single extruder.

FIG. 6 illustrates an alternative construction for a molten resin laminator useful in producing multilaminate thermoplastic films according to the principles described herein. In this figure,, 13 represents the alternative molten resin laminator having a body 41 with a centrally and vertically disposed passageway 42, which is generally circular in cross section, running therethrough.

Located at suitable positions along the length of the passageway 42 are annular dies 43 and 44. Annular die 43 is connected with an extruder (not shown) via conduit 45 and channel 46. Annular die 44 is connected with an extruder (not shown) via conduit 47 and channel 48. Annular die 43 has an annular chamber 49 therein concentric with passageway 42. Located in the bottom of annular chamber 49 are arcuate shaped die orifices 50(a) and 50(b), formed by circular partition 51 communicating with passageway 42 for extruding resinous material thereinto. Similarly, with respect to annular die 44, there is an annular chamber 52 located concentrically around the periphery of passageway 42. Annular die 44 has an arcuate shaped orifice 53 formed by semicircular partition 54 in its bottom portions which communicates with channel 42.

A primary resin is introduced from an extruder (not shown) into the upper end of passageway 42 via conduit 55.

Passageway 42 opens into a die manifold chamber of a film extruding die having an elongated, narrow orifice such as that illustrated in FIG. 3.

Holes may be tapped in molten resin laminator body 41 for use of resistance heating elements (not shown).

FIG. 7 is a sectional view of the molten resin laminator of FIG. 6 taken along line 7—7, and shows in cross section annular die 43. Similarly, FIG. 8 is a sectional view of the annular die 44 taken along line 8—8. As may be seen from these figures, the die openings 50(a), 50(b) and 53 in the bottoms of annular dies 43 and 44 are arcuate shaped. Annular die 43 is constructed so that the resin expressed by it into channel 42 forms an arcuate layer on both sides of the resin plug traveling down passageway 42. By having arcuate shaped die openings 50(a) and 50(b), as illustrated, the two layers of that resin are more uniform in thickness across the width of the finished film web. This is because during lateral expansion of the composite resin plug in the die manifold chamber, the arcuate shaped resin layers expand into essentially flat, parallel layers instead of into elongated doughnut shaped layers such as would result if the annular die orifices were circular. Therefore, the arcuate shaped orifices are located, with respect to the film extruding die, in a manner such that a line passing through the two terminal points of each arcuate orifice is parallel to the longitudinal axis of the orifice of the film extruding die. Similarly, die 44 expresses the resin which is to form only one layer of the finished product, and is arcuate shaped to enhance uniformity of thickness. This arcuate shape of the annular die openings is important to obtain films having uniform layer thickness.

The operation of the embodiment illustrated in FIGS. 6 to 8 is as follows. Resins having different characteristics and having been rendered molten in conventional extruders are fed into molten resin laminator 40 via conduits 45, 47 and 55.

The primary resin enters molten resin laminator 40 through conduit 55, and travels as a circular plug down passageway 42 until it reaches annular die 43.

A secondary resin is fed into laminator 40 via conduit 45 and enters chamber 49 of annular die 43 via channel 46. From annular chamber 49 the secondary resin is expressed through arcuate shaped die orifices 50(a) and 50(b), and forms two arcuate-shaped sheaths around the primary resin plug moving past annular die 43. These secondary resin sheaths, as they come into contact with the primary resin plug, are traveling in paths that are substantially parallel to the flow path of the primary resin plug. The composite resin plug comprising the primary resin plug and secondary resin sheaths then appears as shown in cross section in FIG. 9. In FIGS. 9 to 12, 60 represents the primary resin,, 61(a) and 61(b) represent the secondary resin sheaths, and 62 represents the tertiary resin sheath.

The composite resin plug next passes the location of annular die 44. A tertiary resin is expressed through arcuate shaped orifice 53, and forms an arcaute shaped sheath around about half the composite resin plug. The composite resin plug now appears as illustrated in cross section in FIG. 10.

Figure 11:
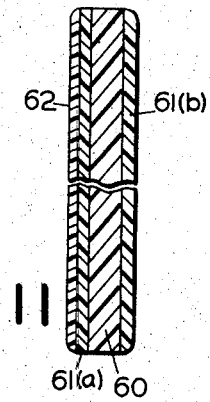
FIG. 11 is a cross section of a composite resin plug as it elongates in the die head.

As the coated composite plug containing the three resins enters the die manifold chamber of a film expressing die such as illustrated in FIG. 3, it spreads out laterally along the longitudinal length thereof, and appears as shown in FIG. 11.

Figure 12:
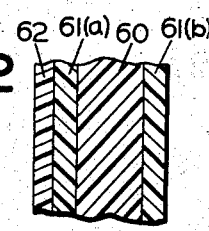
FIG. 12 is a cross section of the multilaminate film produced by the laminator of FIG. 6.

The multilaminate film, as expressed from die orifice 58, has a cross section as appears in FIG. 12. As is seen, the multilaminate film produced by the apparatus illustrated in FIG. 6 contains 4 layers, the primary resin layer 60 being surrounded on both sides by secondary resin layers 61(a) and 61(b), and on secondary resin layer 61(a) is tertiary resin layer 62.

The following example illustrates the operation of the molten resin laminator embodiment of FIG. 6.

EXAMPLE 2

The procedure of Example 1 was repeated except that the molten resin laminator of FIG. 6 replaced that of FIG. 3. A multilaminate film having four layers, as illustrated in FIG. 12, is obtained. Layer 60 is polyethylene, layers 61(a) and 61(b) are polypropylene; and layer 62 is a copolymer of ethylene-vinyl acetate.

While in the description of the embodiment illustrated in FIG. 6 there has been described a method and apparatus for producing a multilaminate film having four layers, it is apparent that the annular dies may have orifice configurations therein that will produce other film configurations. Also, while in the embodiment illustrated in FIG. 6 there has been shown two annular dies, it is apparent that more than two may be employed, or only one may be employed.

While in the foregoing description of the laminator of this invention it has been described as extruding a free multilaminate film, it is also useful as a coater for extruding a multilaminate coating upon any suitable web substrate, such as paper, cellophane, metal, metal foils, resin films, textiles, and so forth.

Figure 13:
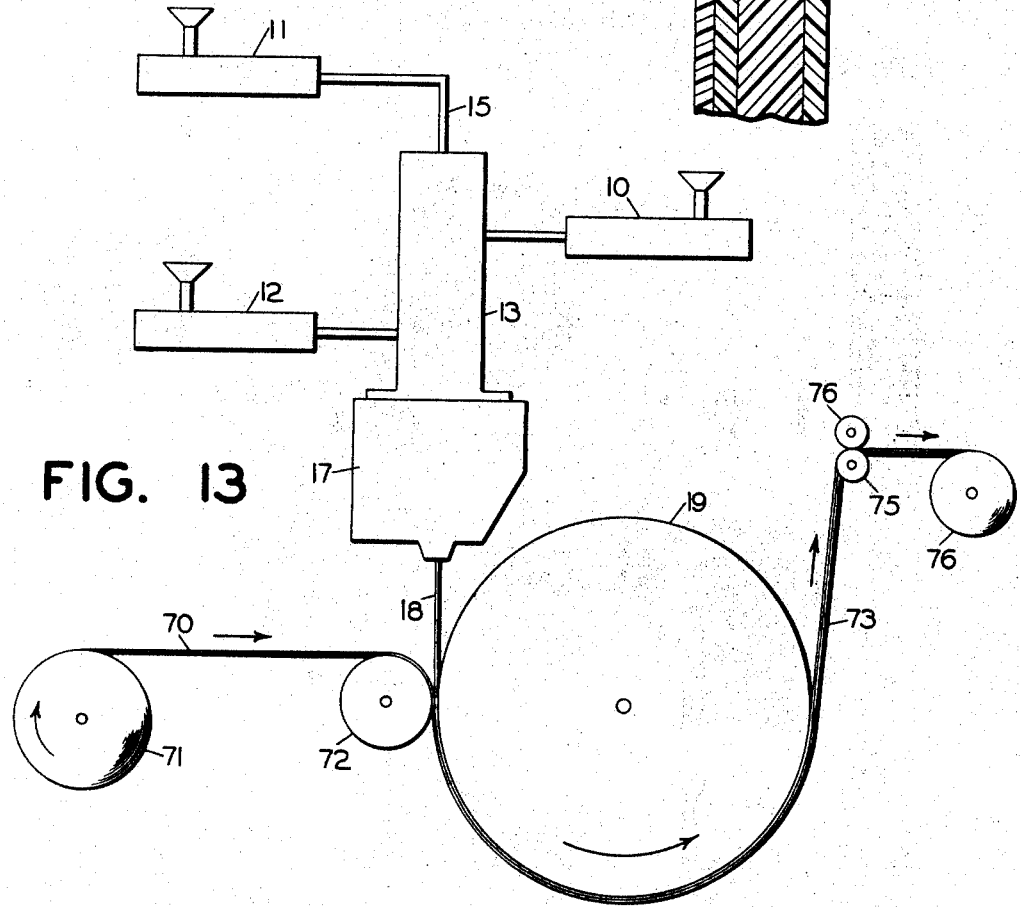
FIG. 13 is a schematic representation of the laminator of this invention employed as a coater.

FIG. 13 illustrates the laminator of the invention employed as a coater. Web substrate 70 is unwound from roll 71, and feeds around rubber pressure roll 72 into the nip formed between rubber pressure roll 72 and chill roll 19. Multilaminate resin 18 extruded from die 17 is also fed into the nip where it contacts substrate 70, and is adhesively bonded thereto. The multilaminate resin film 18 may be contacted with the web substrate 70 prior to introduction into the nip or it may be contacted with the substrate in the nip, or it may be first contacted with the chill roll 19 prior to introduction into the nip. From chill roll 19 the multilaminate coated substrate 73 is fed through trimmer rolls 74 and 75 and wound up into roll 76.

The multilaminate coating may have any desired number of laminae, two or greater. Also, more than one application of a multilaminate coating may be made, either to the same side or to opposite sides of the web substrate, and the plurality of multilaminate coatings may be of the same or differing configurations.

The following example illustrates the use of the laminator of this invention as a coater:

EXAMPLE 3

The extruders 10, 11 and 12 and laminator 13 are the same as those employed in Example 1. A low density polyethylene is fed into extruder 11, and a copolymer of ethylene-vinyl acetate is fed into both extruders 10 and 12. The web substrate 70 is 1.0 mil saran-coated (both sides) cellophane. The polyethylene is fed into the laminator at a rate of about 250 lbs./hr. and each of the ethylene-vinyl acetate copolymer streams is fed into the laminator at a rate of about 15 lbs./hr. The cellophane is fed through the coating station as illustrated in FIG. 13 at about 300 f.p.m. The resulting multilaminate coated cellophane has a caliper of about 3.0 mils, and is useful as a packaging film.

Other modifications which are intended to be included within the scope of the following claims will be apparent to those skilled in the art.

We claim:

1. In a process of producing multilaminate thermoplastic film involving extrusion through a long, narrow orifice of a die, the combination which includes:
   (a) establishing laminar flow of a plurality of interfacially bondable molten plastic resin streams in a flowing composite molten plastic resin plug;
   (b) laterally expanding said flowing composite molten plastic resin plug widthwise of said streams while maintaining the thickness of the resin plug substantially constant during said lateral expansion so as to produce a laterally expanded molten plastic resin laminate stream substantially equal in width to that of said multilaminate thermoplastic film which is to be extruded through said long, narrow orifice of a die and substantially equal in thickness to the unexpanded resin plug from which it is formed;
   (c) laminarly flowing said laterally expanded molten plastic resin laminate stream to said long, narrow orifice and meanwhile compressionally convergently reducing said laterally expanded plastic resin stream in thickness to said long, narrow orifice while maintaining the width of said expanded resin stream substantially constant; and
   (d) extruding said multilaminate thermoplastic film through said long, narrow orifice under supply of said expanded and converged plastic resin laminate stream to said orifice.

2. The process of claim 1 wherein said expansion of said flowing composite molten plastic resin plug is effected in a manifold having a substantially rectangular cross section to produce said laterally expanded molten plastic resin laminate stream substantially equal in width to that of said multilaminate thermoplastic film which is to be extruded through said long, narrow orifice of a die.

3. In a process of producing a multilaminate thermoplastic film involving extrusion through a long, narrow orifice of a die, the combination which includes:
   (a) rendering molten a plurality of thermoplastic resins, said resins being bondable to each other in a molten condition;
   (b) flowing longitudinally parallel streams of the plurality of molten thermoplastic resins through discrete passageways for a distance sufficient to establish laminar flow of each of said streams and thence flowing said longitudinally parallel streams in contact with one another interfacially in a common passageway and thereby forming from said streams a flowing composite molten plastic resin plug;
   (c) laterally expanding said flowing composite molten plastic resin plug widthwise of said longitudinally parallel streams therein while maintaining the thickness of the resin plug substantially constant during said lateral expansion so as to produce a laterally expanded molten plastic resin laminate stream substantially equal in width to that of said multilaminate thermoplastic film which is to be extruded through said long, narrow orifice of a die and substantially equal in thickness to the unexpanded resin plug from which it is formed.
   (d) laminarly flowing said laterally expanded molten plastic resin laminate stream to said long, narrow orifice and meanwhile compressionally convergently reducing said laterally expanded plastic resin stream in thickness to said long, narrow orifice while maintaining the width of said expanded resin stream substantially constant; and
   (e) extruding said multilaminate thermoplastic film through said long, narrow orifice under supply of said expanded and converged molten plastic resin laminate stream to said orifice.

4. The process of claim 3 wherein said expansion of said flowing composite molten plastic resin plug is effected in a manifold having a substantially rectangular cross section to produce said laterally expanded molten plastic resin laminate stream substantially equal in width to that of said multilaminate thermoplastic film which is to be extruded through said long, narrow orifice of a die.

References Cited

UNITED STATES PATENTS

| | | | |
|---|---|---|---|
| 3,423,498 | 1/1969 | Lefevre | 264—171 |
| 3,321,804 | 5/1967 | Breidt, Jr., et al. | 264—171 |
| 3,565,985 | 2/1971 | Schrenk et al. | 264—171 |
| 3,524,795 | 8/1970 | Peterson | 264—171 |
| 3,485,912 | 12/1969 | Schrenk et al. | 264—171 |

JEFFERY R. THURLOW, Primary Examiner

U.S. Cl. X.R.

156—244; 264—176 R